United States Patent
Yuan et al.

(10) Patent No.: US 12,038,976 B2
(45) Date of Patent: Jul. 16, 2024

(54) MODEL PUSHING METHOD AND DEVICE, MODEL REQUESTING METHOD AND DEVICE, STORAGE MEDIUM AND ELECTRONIC DEVICE

(71) Applicant: ZTE CORPORATION, Guangdong (CN)

(72) Inventors: Liya Yuan, Guangdong (CN); Wei Meng, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 295 days.

(21) Appl. No.: 17/603,622

(22) PCT Filed: Apr. 13, 2020

(86) PCT No.: PCT/CN2020/084470
§ 371 (c)(1),
(2) Date: Oct. 14, 2021

(87) PCT Pub. No.: WO2020/211722
PCT Pub. Date: Oct. 22, 2020

(65) Prior Publication Data
US 2022/0197953 A1  Jun. 23, 2022

(30) Foreign Application Priority Data
Apr. 15, 2019  (CN) .......................... 201910300243.X (51) Int. Cl.
*G06Q 10/00* (2023.01)
*G06F 16/903* (2019.01)

(52) U.S. Cl.
CPC .............................. *G06F 16/90335* (2019.01)

(58) Field of Classification Search
None
See application file for complete search history.

(56) References Cited

U.S. PATENT DOCUMENTS

| 2017/0329856 | A1* | 11/2017 | Jiang ......................... G06N 7/01 |
| 2017/0372268 | A1 | 12/2017 | Ilan et al. |
| 2018/0131621 | A1 | 5/2018 | Wu et al. |

FOREIGN PATENT DOCUMENTS

| CN | 106533714 A | 3/2017 |
| CN | 107707381 A | 2/2018 |

(Continued)

OTHER PUBLICATIONS

Barrett Stephen. Blending State Differences and Change Operations for Metamodel Independent Merging of Software Models. Apr. 2011.*

(Continued)

*Primary Examiner* — Tuankhanh D Phan
(74) *Attorney, Agent, or Firm* — Li & Cai Intellectual Property (USA) Office (57) ABSTRACT

The present disclosure provides a model pushing method, a model requesting method, a model pushing device, a model requesting device, a storage medium and an electronic device. The model pushing method includes: receiving a model matching instruction sent by an orchestrator, with the model matching instruction generated based on an analysis requirement; searching for a model corresponding to the model matching instruction; and pushing, in a case where the model is found, the found model to a destination node requiring the model.

18 Claims, 4 Drawing Sheets

(56) References Cited

FOREIGN PATENT DOCUMENTS

CN          109218046 A     1/2019
WO        2018222289 A1    12/2018

OTHER PUBLICATIONS

Bouckaert Remco. BEAST 2.5: An advanced software platform for Bayesian evolutionary analysis. Feb. 2019 Remco Bouckaert.*
European Patent Office, The extended European search report issued Dec. 22, 2022 for application No. EP20790513.4.
Anonymous: "Framework for data handling to enable machine learning in future networks including IMT-2020", ITU-T Y.3174, Jan. 1, 2019.
WIPO, International Search Report issued on Jun. 22, 2020.

\* cited by examiner

MODEL PUSHING METHOD AND DEVICE, MODEL REQUESTING METHOD AND DEVICE, STORAGE MEDIUM AND ELECTRONIC DEVICE

CROSS-REFERENCE TO RELATED APPLICATION

The present disclosure claims the priority to the Chinese Patent Application No. 201910300243.X filed with the CNIPA on Apr. 15, 2019, the entire contents of which are incorporated here by reference.

TECHNICAL FIELD

The present disclosure relates to the field of communications, and in particular, to a model pushing method, a model requesting method, a model pushing device, a model requesting device, a storage medium and an electronic device.

BACKGROUND

Compared with traditional networks, new technologies such as Software Defined Network (SDN) and Network Function Virtualization (NFV) are introduced into 5G (5th Generation Mobile Communication Technology) Networks, and those technologies bring complexity to management, and operation and maintenance while increasing network flexibility. Thus, automated and intelligent operation and maintenance capabilities will become an inelastic demand of telecommunication networks in the era of 5G. Due to the natural advantages in the aspects of data analysis with a large number of computations, cross-domain feature mining and dynamic strategy generation, the artificial intelligence technology will give new modes and capabilities to network operation and maintenance in the era of 5G.

The following two aspects must be considered when an artificial intelligence model is used: modeling and application. Modeling refers to a process of selecting a proper algorithm in response to a certain specific analysis requirement, and training a model with historical data to enable the model to obtain a high-confidence analysis result according to input data. Application refers to a process of selecting a model in accordance with an application scene from existing models, and deploying and running the model at a specified position. By utilizing analysis data generated at runtime, model parameters can be continuously optimized, so that the model can be adjusted in time to maintain the accuracy of model reasoning.

At present, in a process of introducing big data and artificial intelligence technology into management and operation and maintenance of networks, those of ordinary skill in the art focus on the artificial intelligence modeling, and deployment and optimization of models are usually specific to a single model. However, there is no unified solution to the management of a large number of existing models and the application of the models to networks (including selection, deployment and optimization of the models).

In view of the problems in existing related art such as a lack of a unified technical solution to how to select a required model from a large number of models, no effective solutions have been proposed.

SUMMARY

The embodiments of the present disclosure provide a model pushing method, a model requesting method, a model pushing device, a model requesting device, a storage medium and an electronic device, so as to at least solve the problems in the existing art such as the lack of a unified technical solution to how to select a required model from a large number of models.

According to an embodiment of the present disclosure, a model pushing method is provided and includes: receiving a model matching instruction sent by an orchestrator, with the model matching instruction generated based on an analysis requirement; searching for a model corresponding to the model matching instruction; and pushing, when the model is found, the found model to a destination node requiring the model.

According to another embodiment of the present disclosure, a model requesting method is further provided and includes: generating a model matching instruction based on an analysis requirement; and sending the generated model matching instruction to a model platform to instruct the model platform to search for a model corresponding to the model matching instruction, and pushing, when the model is found, the found model to a destination node requiring the model.

According to another embodiment of the present disclosure, a model pushing device is further provided and includes: a receiving module configured to receive a model matching instruction sent by an orchestrator, with the model matching instruction generated based on an analysis requirement; a searching module configured to search for a model corresponding to the model matching instruction; and a pushing module configured to push, when the model is found, the found model to a destination node requiring the model.

According to another embodiment of the present disclosure, a model requesting device is further provided and includes: a generating module configured to generate a model matching instruction based on an analysis requirement; and a sending module configured to send the generated model matching instruction to a model platform to instruct the model platform to search for a model corresponding to the model matching instruction, and push, when the model is found, the found model to a destination node requiring the model.

According to still another embodiment of the present disclosure, a storage medium having a computer program stored therein is further provided, and the computer program is configured to perform the steps of the method according to any one of the above embodiments when being executed.

According to yet another embodiment of the present disclosure, an electronic device is further provided and includes a memory having a computer program stored therein and a processor configured to execute the computer program to perform the steps of the method according to any one of the above embodiments.

According to the present disclosure, by receiving the model matching instruction sent by the orchestrator, with the model matching instruction generated based on the analysis requirement, searching for the model corresponding to the model matching instruction, and pushing, when the model is found, the found model to the destination node requiring the model, the problems such as the lack of a unified technical solution to how to select a required model from a large number of models can be solved, and technical solutions to how to select a required model are provided.

BRIEF DESCRIPTION OF THE DRAWINGS

The drawings described here are intended to provide a further understanding of the present disclosure and constitutes a part of the present disclosure. The exemplary embodiments of the present disclosure and the description thereof are intended to explain the present disclosure, but do not constitute improper limitation to the present disclosure. In the drawings.

DETAILED DESCRIPTION

The present disclosure will be described in detail below with reference to the drawings and embodiments. It should be noted that the embodiments of the present disclosure and the features therein may be combined with each other if no conflict is incurred.

It should be noted that the terms "first", "second" and the like in description, claims, and drawings of the present disclosure are used for distinguishing between similar objects, but not necessarily for describing a particular order or chronological order.

Figure 1:
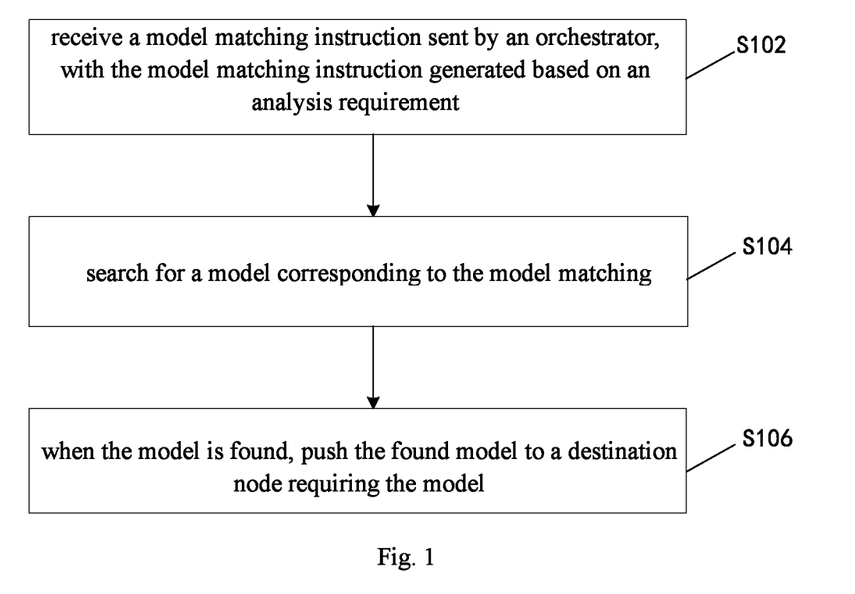
FIG. 1 is a flowchart illustrating a model pushing method according to an embodiment of the present disclosure.

An embodiment of the present disclosure provides a model pushing method. FIG. 1 is a flowchart illustrating a model pushing method according to an embodiment of the present disclosure. As shown in FIG. 1, the method includes: step S102, receiving a model matching instruction sent by an orchestrator, with the model matching instruction generated based on an analysis requirement; step S104, searching for a model corresponding to the model matching instruction; and step S106, when the model is found, pushing the found model to a destination node requiring the model.

According to the present disclosure, by receiving the model matching instruction sent by the orchestrator, with the model matching instruction generated based on the analysis requirement, searching for the model corresponding to the model matching instruction, and pushing, when the model is found, the found model to the destination node requiring the model, the problems such as the lack of a unified technical solution to how to select a required model from a large number of models can be solved, and the technical solutions to how to select a required model are provided.

In an embodiment of the present disclosure, the step of searching for the model corresponding to the model matching instruction includes at least one of: searching a main model platform for the model corresponding to the model matching instruction; searching a joint model platform of the main model platform for the model corresponding to the model matching instruction; or searching the main model platform and the joint model platform for the model corresponding to the model matching instruction. That is, the search may be carried out in the main model platform or the joint model platform, and may also be carried out taking the main model platform and the joint model platform as one search repository.

In the embodiments of the present disclosure, the step S104 may be implemented as follows in an optional example: feeding back a search success message to the orchestrator when the model corresponding to the model matching instruction is found; and feeding back a search failure message to the orchestrator when the model corresponding to the model matching instruction is not found.

In an embodiment of the present disclosure, the step of pushing the found model to the destination node requiring the model includes: packaging at least the model and metadata thereof into a file; and sending the packaged file to the destination node. The packaged file may be a docker file or other executable files, which is not limited by the embodiment of the present disclosure.

In an embodiment of the present disclosure, when a single model is found, the single model is packaged into a file and sent to the destination node; and when a plurality of models are found, the plurality of models are subjected to at least one of the following operations: orchestration and combination, or verification, and then are packaged into a file and sent to the destination node.

That is, after receiving the model matching instruction, a model engine determines a model search domain according to a joint type provided by the orchestrator and searches to find whether a model in accordance with the model matching instruction exists. If such a model does not exist, a model matching failure message is sent to the orchestrator; if a single model is matched, the single model is directly packaged into a deployable artificial intelligence application; and if a plurality of models are matched, orchestration and combination, and/or verification of the models are completed firstly, and then an orchestration information file and the models are packaged together into a deployable artificial intelligence application.

In an embodiment of the present disclosure, in order to improve the accuracy of model pushing, the method further includes: receiving a model updating request, which is sent by the orchestrator when the orchestrator detects that the model meets a model updating condition, with the model updating condition including that the accuracy of the model pushed to the destination node is lower than a preset threshold; sending the model corresponding to the model updating request to a sandbox in which the model corresponding to the model updating request is trained and optimized; and receiving the model which is successfully trained in the sandbox.

In an embodiment of the present disclosure, the model matching instruction includes at least one of the following parameters: a model or algorithm attribute, requirements for input and output of the model, indication information configured to indicate whether the joint model platform is to be searched, or information of the destination node.

The technical solutions in the above embodiments of the present disclosure relate to the application of artificial intelligence to communications in networks, such as next generation networks based on 5G, SDN, NFV and other technologies, and aim to realize automatic management of artificial intelligence models and apply such automatic management to the technologies and systems of the networks.

Figure 2:
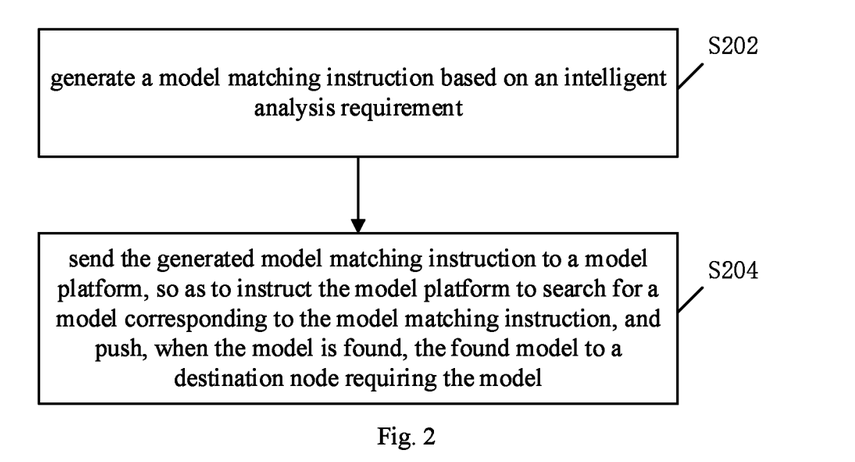
FIG. 2 is a flowchart illustrating a model requesting method according to an embodiment of the present disclosure.

An embodiment of the present disclosure provides a model requesting method. FIG. 2 is a flowchart illustrating a model requesting method according to an embodiment of the present disclosure. As shown in FIG. 2, the method includes: step S202, generating a model matching instruction based on an analysis requirement; and step S204, sending the generated model matching instruction to a model platform to instruct the model platform to search for a model corresponding to the model matching instruction, and pushing, when the model is found, the found model to a destination node requiring the model.

According to the present disclosure, by sending the model matching instruction generated based on the analysis requirement to the model platform to instruct the model platform to search for the model corresponding to the model matching instruction, and pushing, when the model is found, the found model to the destination node requiring the model, the problems such as the lack of a unified technical solution to how to select a required model from a large number of models can be solved, and the technical solutions to how to select a required model are provided.

In an embodiment of the present disclosure, after the step of sending the generated model matching instruction to the model platform, the method further includes: receiving a search success message fed back by the model platform when the model corresponding to the model matching instruction is found; and receiving a search failure message fed back by the model platform when the model corresponding to the model matching instruction is not found.

In an embodiment of the present disclosure, in order to improve the accuracy of model pushing, the method further includes: sending a model updating request to the model platform when it is detected that the model meets a model updating condition, so as to instruct the model platform to send the model corresponding to the model updating request to a sandbox, and receiving the model which is successfully trained in the sandbox, with the model corresponding to the model updating request trained and optimized in the sandbox, and the model updating condition including that the accuracy of the model pushed to the destination node is lower than a preset threshold.

The above processes of model pushing and model requesting are illustrated below by an example, which is not intended to limit the technical solutions in the embodiments of the present disclosure.

Through the example, the present disclosure provides an artificial intelligence platform system capable of interacting with a telecommunication network in real time and a method of realizing automatic selection, deployment and optimization of artificial intelligence models in the telecommunication network through the interaction.

Figure 3:
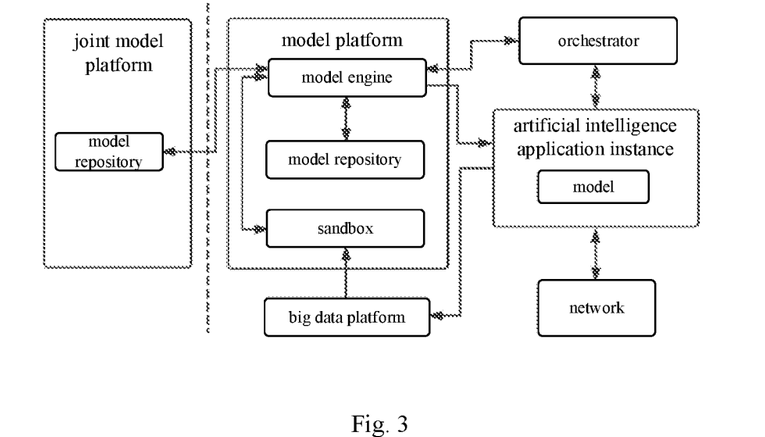
FIG. 3 is a schematic structural diagram of a model pushing system according to an example of the present disclosure.

FIG. 3 is a schematic structural diagram of a model pushing system according to the example of the present disclosure. As shown in FIG. 3, a model platform is composed of a model engine, a model repository, a sandbox and other modules.

The model repository is configured to store artificial intelligence models and metadata corresponding thereto. The metadata of the model is a series of descriptive data of the model which include a model name, a version, used programming language and algorithm, runtime dependencies, deployment conditions and requirements, requirements for type (e.g. an image or a numerical value), content and format of input data, a description of a type of output data, etc.

The model engine is configured to manage the models in the model repository, and the management of the models includes addition, deletion, modification and search of the models. The model engine selects an artificial intelligence model according to a model matching instruction sent by an orchestrator, and pushes the model to a specified position in a network. The orchestrator is configured to manage artificial intelligence application instances in the network, and the management includes sending a model matching instruction and a model optimization instruction, managing a life cycle of an artificial intelligence application instance and monitoring a running state of an artificial intelligence application instance. The network may be provided with a plurality of orchestrators, each of which is responsible for a corresponding artificial intelligence instance management domain. The orchestrator creates a management entry for each artificial intelligence application instance in the management domain, and the management entry includes an Identity Document (ID), a state machine, a location, model information, and the like, of the artificial intelligence application instance.

Operating modes of the model engine include an independent mode and a joint mode. In the independent mode, the model engine can only search for a model in a model repository of a model platform where the model engine is located when receiving a model matching request. In the joint mode, a model platform where a model engine directly interacting with the orchestrator is located serves as a main platform, and the model engine of the main platform can acquire a model from a model repository of a joint model platform. The joint model platform refers to a model platform which provides a management interface of model repository for the model engine of the main platform and does not directly interact with the orchestrator.

The sandbox is configured to provide a running environment for retraining, verification and optimization of the models.

As shown in FIG. 3, when an intelligent analysis demand is generated in a communication network, the orchestrator converts the intelligent analysis demand into a model requirement, and sends a model matching request to the model engine of the model platform, and the request includes identity information of the orchestrator, the model requirement, and node type and location information of a target node of model deployment. The identity information of the orchestrator includes a type, an address, a joint type, and the like, of the orchestrator. The model requirement includes a functional requirement, a performance requirement, and the like, for the model.

The joint type in the identity information of the orchestrator may be a non-joint type, a main platform-priority joint type, or an equally joint type, according to the operating mode of the model engine. When the operating mode of the model engine is the independent mode, the joint type in the identity information of the orchestrator can only be the non-joint type, that is, models in only one model repository can be requested. When the operating mode of the model engine is the joint mode, the joint type in the identity information of the orchestrator may be the non-joint type, the main platform-priority joint type, or the equally joint type. The main platform-priority joint type indicates that the matching for the model is carried out first in a model repository (a main model repository) of a main platform, and is carried out in a model repository (a joint model repository) of a joint platform after the matching in the main model repository fails. The equally joint type indicates that the matching is carried out simultaneously in the master model repository and the joint model repository, which are both taken as search domains.

After receiving a model matching instruction, the model engine determines a model search domain according to the joint type provided by the orchestrator and searches to find whether a model in accordance with the model matching instruction exists. If such a model does not exist, a model matching failure message is sent to the orchestrator; if a single model is matched, the single model is directly packaged into a deployable artificial intelligence application; and if a plurality of models are matched, the models are subjected to orchestration and combination, and/or verification firstly, and then an orchestration information file and the models are packaged together into a deployable artificial intelligence application.

The model engine pushes the artificial intelligence application, the metadata of the model and the identity information of the orchestrator to a target node of model application.

If the orchestrator receives a model matching failure message, the orchestrator sends an alarm message. If the orchestrator receives a model matching success message, the orchestrator pre-creates a management entry of artificial intelligence application instance, with information in the management entry in an initial state, and sends an artificial intelligence application instance creation request to the target node of model deployment.

After receiving the application instance creation request, the target node of model deployment verifies the identity information of the orchestrator. If the verification succeeds, an instance is created and started, and an instance creation success message including an instance ID, instance running information, and the like, is sent to the orchestrator. The instance ID can and only can identify a unique instance in the target node; and if the verification fails, an illegal access alarm is sent.

After receiving the instance creation success message, the orchestrator activates and updates the management entry of the instance accordingly, and the activation and updating include changing a state machine of the instance to a running state, and the like. Then the orchestrator starts a monitoring process for the state of the instance, and sends a model updating strategy to the target node.

When the instance is in the running state, a reasoning result is obtained according to input of the model, a network orchestration or control plane determines network configuration information according to the reasoning result, and configures a network accordingly to optimize the network.

When the instance is in the running state, the target node sends output of the model to a big data platform under a certain rule according to the model updating strategy, with the output taken as training and test data in the updating of the model.

If the orchestrator monitors that the model meets a model updating condition (for example, the accuracy of the model is lower than a threshold), the orchestrator sends a model updating request to the model engine.

The model engine selects a model to be updated according to the model updating request and pushes the model to be updated to the sandbox.

The sandbox extracts the latest data from the big data platform, and performs retraining and optimization on the model.

After the training is finished, the sandbox feeds back a model training success message to the model engine.

After receiving the model training success message, the model engine stores the updated model into the model repository, packages a new artificial intelligence application, and pushes the same to the target node. The orchestrator deploys a new instance in the target node; if the deployment succeeds, an instruction to destroy the original instance is sent to allow the target node to stop and delete the original instance; and if the deployment fails, an alarm message is sent.

Compared with the existing art, the embodiments of the present disclosure propose the architecture and methods for automatic selection, deployment and optimization of artificial intelligence models with regard to the application of artificial intelligence to networks, thereby achieving unified management of the artificial intelligence models in the networks, and improving autonomy of network intellectualization.

Through the above description of the embodiments, those of ordinary skill in the art can understand that the methods according to the above embodiments may be implemented by software together with a necessary general-purpose hardware platform, and may also be implemented by hardware. Based on such understanding, the technical solutions of the present disclosure may be implemented in the form of a software product, which is stored in a storage medium (such as a Read-Only Memory (ROM)/Random Access Memory (RAM), a magnetic disk, or an optical disc) and includes several instructions to enable a terminal device (which may be a mobile phone, a computer, a server, or a network device) to perform the method described in each embodiment of the present disclosure.

An embodiment of the present disclosure further provides a model pushing device configured to implement the above embodiments and optional implementations, and what is illustrated above is not repeated here. The term "module" used below refers to software, hardware, or a combination of software and hardware that can perform predetermined functions. Although the device described in the following embodiment may be implemented by software, the implementations of the device by hardware or a combination of software and hardware are possible and can be conceived.

Figure 4:
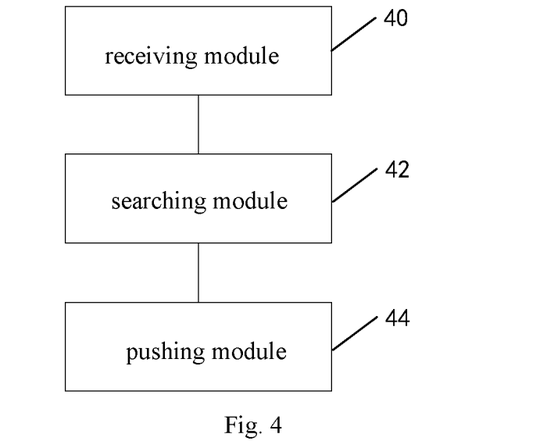
FIG. 4 is a block diagram of a model pushing device according to an embodiment of the present disclosure.

FIG. 4 is a block diagram of a model pushing device according to an embodiment of the present disclosure. As shown in FIG. 4, the device includes: a receiving module 40 configured to receive a model matching instruction sent by an orchestrator, with the model matching instruction generated based on an analysis requirement; a searching module 42 configured to search for a model corresponding to the model matching instruction; and a pushing module 44 configured to push, when the model is found, the found model to a destination node requiring the model.

In an embodiment of the present disclosure, the searching module 42 is further configured to perform one of the following operations: searching a main model platform for the model corresponding to the model matching instruction; searching a joint model platform of the main model platform for the model corresponding to the model matching instruction; or searching the main model platform and the joint model platform for the model corresponding to the model matching instruction.

In an embodiment of the present disclosure, the searching module 42 is further configured to feed back a search success message to the orchestrator when the model corresponding to the model matching instruction is found, and feed back a search failure message to the orchestrator when the model corresponding to the model matching instruction is not found.

In an embodiment of the present disclosure, the pushing module 44 is further configured to package at least the model and metadata thereof into a file, and send the packaged file to the destination node.

In an embodiment of the present disclosure, the pushing module 44 is further configured to perform the following operations: when a single model is found, packaging the single model into a file and sending the packaged file to the destination node; and when a plurality of models are found, subjecting the plurality of models to at least one of the following operations: orchestration and combination, or verification, then packaging the plurality of models into a file, and sending the packaged file to the destination node.

In an embodiment of the present disclosure, the pushing module 44 is further configured to receive a model updating request, which is sent by the orchestrator when the orchestrator detects that the model meets a model updating condition, with the model updating condition including that the accuracy of the model pushed to the destination node is lower than a preset threshold, send the model corresponding to the model updating request to a sandbox in which the model corresponding to the model updating request is trained and optimized, and receive the model which is successfully trained in the sandbox.

In an embodiment of the present disclosure, the model matching instruction includes at least one of the following parameters: a model or algorithm attribute, requirements for input and output of the model, indication information configured to indicate whether the joint model platform is to be searched, or information of the destination node.

An embodiment of the present disclosure further provides a model requesting device configured to implement the above embodiments and optional implementations, and what is illustrated above is not repeated here. The term "module" used below refers to software, hardware, or a combination of software and hardware that can perform predetermined functions. Although the device described in the following embodiment may be implemented by software, the implementations of the device by hardware or a combination of software and hardware are possible and can be conceived.

Figure 5:
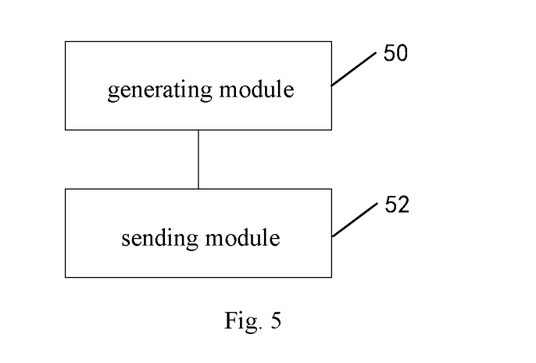
FIG. 5 is a block diagram of a model requesting device according to an embodiment of the present disclosure.

FIG. 5 is a block diagram of a model requesting device according to an embodiment of the present disclosure. As shown in FIG. 5, the device includes: a generating module 50 configured to generate a model matching instruction based on an analysis requirement; and a sending module 52 configured to send the generated model matching instruction to a model platform to instruct the model platform to search for a model corresponding to the model matching instruction, and push, when the model is found, the found model to a destination node requiring the model.

According to the present disclosure, by sending the model matching instruction generated based on the analysis requirement to the model platform to instruct the model platform to search for the model corresponding to the model matching instruction, and pushing, when the model is found, the found model to the destination node requiring the model, the problems such as the lack of a unified technical solution to how to select a required model from a large number of models can be solved, and the technical solutions to how to select a required model are provided.

In an embodiment, the sending module 52 is further configured to receive a search success message fed back by the model platform when the model corresponding to the model matching instruction is found, and receive a search failure message fed back by the model platform when the model corresponding to the model matching instruction is not found.

In an embodiment, the sending module 52 is further configured to send a model updating request to the model platform when the orchestrator detects that the model meets a model updating condition, so as to instruct the model platform to send the model corresponding to the model updating request to a sandbox, and receive the model which is successfully trained in the sandbox, with the model corresponding to the model updating request trained and optimized in the sandbox, and the model updating condition including that the accuracy of the model pushed to the destination node is lower than a preset threshold.

It should be noted that the above modules may be implemented by software or hardware. When by hardware, the modules may be implemented in the following ways: all the modules are located in a same processor, or the modules are randomly combined and located in different processors. However, the implementation of the modules by hardware is not limited to the above ways.

The above embodiments and the exemplary technical solutions are illustrated below by optional examples, which are not intended to limit the technical solutions in the embodiments of the present disclosure.

The model described below refers to a system that is obtained by learning existing data or experience through machine learning, deep learning or other methods and is configured to perform a specific function such as analyzing or predicting.

Exemplarily, each model has a specific function. For example, some models may be configured to predict the time for the number of newly created users and sessions to reach a required number; some models may be configured to predict the time for performing slice expansion; in addition, some models may be configured to determine positions of alarms in a device according to the number or type of alarm messages. In addition, the models may be associated with each other. For example, the time for the number of newly created users and sessions to reach a required number should be output of the predication of the time for performing slice expansion. Therefore, the models may be connected to each other in series, in parallel or in series-parallel. A function of a specific model needs to be determined according to a function of an application instance.

Figure 6:
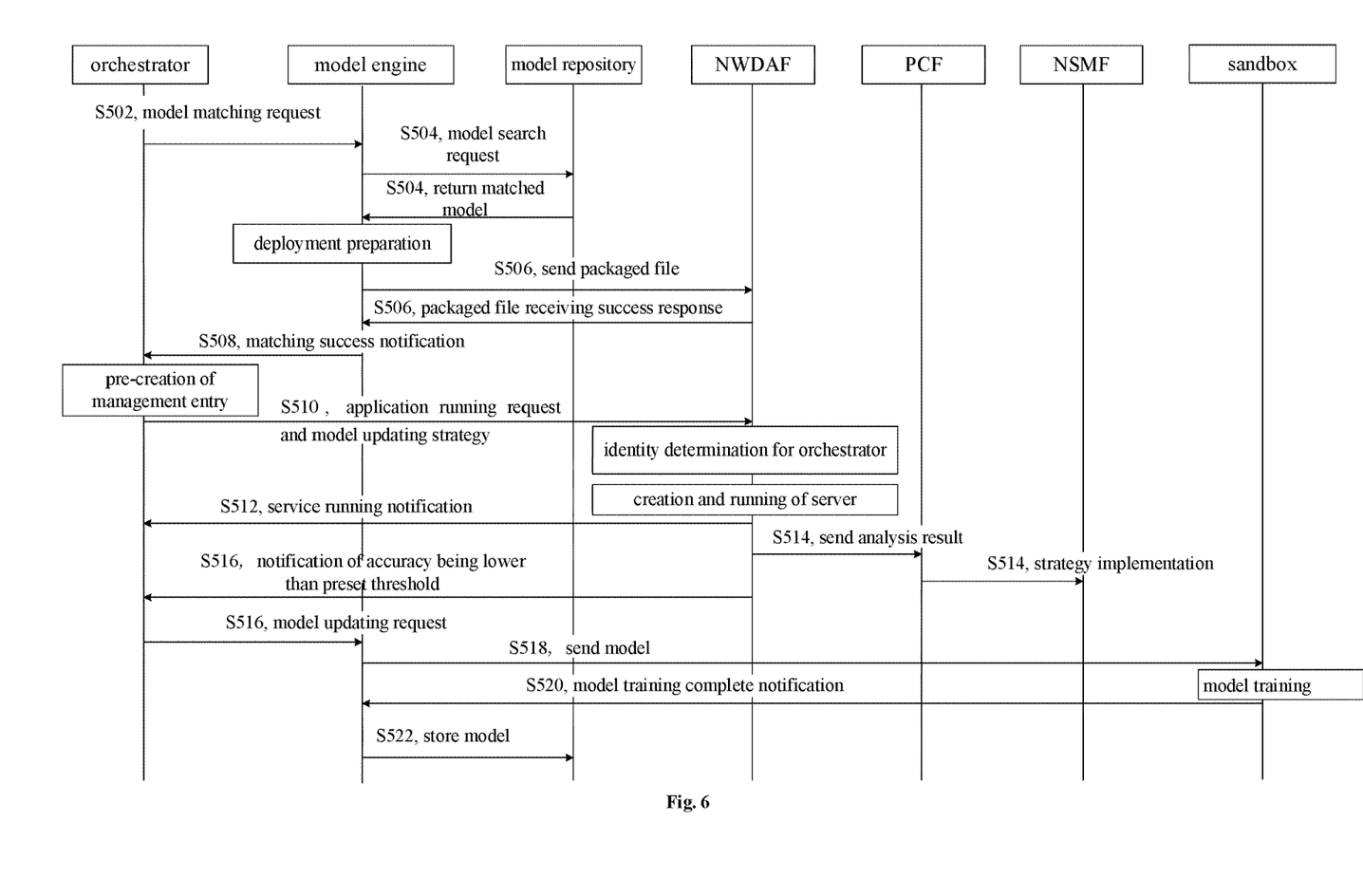
FIG. 6 is a schematic diagram of a resource allocation process according to an optional example of the present disclosure.

Optional Example One: FIG. 6 shows a process of implementing intelligent resource allocation of slices of 5G core network by using artificial intelligence, as shown below.

At step S502, an orchestrator sends a model matching request to a model engine, requesting that a model realize automatic scaling of slices based on the traffic in the next 10 minutes; the accuracy of the model reaches 90%; a type of a deployment network element for the model is Network Data Analysis Function (NWDAF); an IP address of the deployment network element is 192.168.1.107; and a joint type is a non-joint type.

At step S504, the model engine finds available models in a model repository, namely, a convolutional neural network model with an ID of 1001 configured to predict network traffic, and a reinforcement learning model with an ID of 1002 configured to realize intelligent resource allocation of the slices according to traffic information and Quality of Service (QoS) requirements of each slice.

Deployment preparation includes connecting the two models in series as required; and packaging the serially connected models, a dependent runtime environment of the models, and metadata into a docker image named Image1.

At step S506, the model engine sends Image1 together with identity information of the orchestrator to an NWDAF network element corresponding to 192.168.1.107, and the NWDAF network element feeds back a packaged file receiving success response.

At step S508, the model engine informs the orchestrator that the model matching is completed, and the orchestrator pre-creates a management entry which is in an initial state.

At step S510, an Image1 running request and a model updating strategy are sent to 192.168.1.107 by the orchestrator (the model updating is carried out when the accuracy of the model 1001 decreases to be below 80%, and the accuracy here can be interpreted as an ratio of times that models searched by the model engine accord with models required by the model matching instruction to total times of requesting models by the model matching instructions).

At step S512, the NWDAF network element verifies that the identity information of the orchestrator is consistent with the identity information of the orchestrator carried by Image1, a service named Instance1 is created and started based on Image1, and the orchestrator is informed of Instance1. The orchestrator activates a management entry of the artificial intelligence Instance1, and sets a state machine of Instance1 to a running state; moreover, the orchestrator sends a keep-alive message to Instance1 every 60 seconds to confirm the state of Instance1, and sends an accuracy statistics request to Instance1 every other day to determine whether to perform model updating.

At step S514, Instance1 receives corresponding data from a network according to data input requirements in the metadata, and outputs an analysis result; based on the result, a Packet Control Function (PCF) determines a slice resource allocation strategy, which is sent to a Network Subnet Slice Management Function (NSSMF) network element by a Network Slice Management Function (NSMF), and is implemented by a Network Function Virtualization Orchestrator (NFVO), so as to realize the resource allocation of the slices. The output result is packaged and sent to a big data platform at a fixed time (which may be midnight every day).

At step S516, the orchestrator sends an updating request of the model 1001 to the model engine when being notified that the accuracy of the convolutional neural network model 1001 decreases to 75%.

At step S518, the model engine selects a training environment containing one GPU (graphics processing unit) as a sandbox for the convolutional neural network model 1001. The sandbox acquires 100 thousand pieces of the latest analysis data of Instance1 stored in the big data platform, and subjects the convolutional neural network model 1001 to retraining and verification, with 80 thousand pieces of the analysis data taken as training data and 20 thousand pieces of the analysis data taken as test data.

At step S520, the model engine receives a model training completion notification, and finds out that the accuracy of the convolutional neural network model 1001 reaches 90% after verifying the convolutional neural network model 1001.

At step S522, the model engine stores the convolutional neural network model 1001 in the model repository.

The subsequent procedures of the process are performed according to the steps S502 to S520. After receiving a message that a new instance Instance2 of the model 1001 enters a running state, the orchestrator sends an Instance1 destruction instruction to 192.168.1.107, and then the node stops and clears Instance1.

Figure 7:
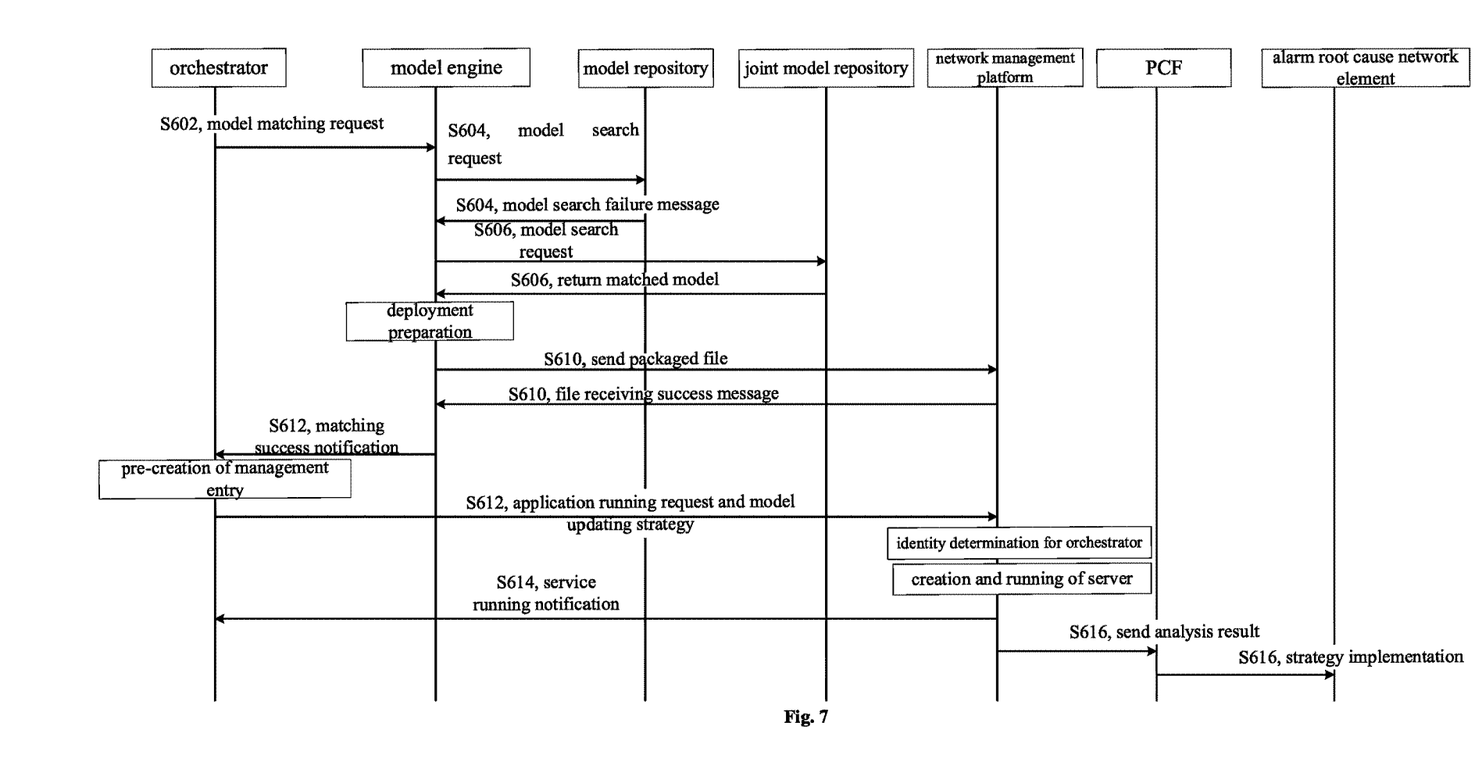
FIG. 7 is a schematic diagram of a model selection process according to an optional example of the present disclosure.

Optional Example Two: FIG. 7 shows a process of applying a network fault root cause analysis model to a network to realize accurate location and tracing of faults.

At step S602, an orchestrator sends a model matching request to a model engine, requesting that a model locate a root alarm message according to an alarm message of a network management system at the same moment, a deployment position of the model is the network management system, and a joint mode gives priority to a local model repository.

At step S604, the model engine fails to find a matched model in a main model repository, then finds the matched model in a joint model repository and selects the model.

At step S606, the model engine succeeds in finding out the matched model in the joint model repository, and returns the matched model.

At step S610, the model engine packages the model, a dependent runtime environment of the model, and metadata into a docker image named Image1, sends Image1 and the identity information of the orchestrator to a network management platform, and receives a file receiving success message fed back by the network management platform.

At step S612, the model engine informs the orchestrator that the model matching is completed, and the orchestrator sends an Image1 running request and a model updating strategy (indicating no updating) to the network management platform.

At step S614, the network management system verifies that the identity information of the orchestrator is consistent with the identity information of the orchestrator carried by Image1, a container named Instance1 is created and started based on Image1, and the orchestrator is informed of Instance1. The orchestrator activates a management entry of Instance1, and sets a state machine of Instance1 to a running state.

At step S616, Instance1 receives corresponding data from a network according to data input requirements in the metadata, and outputs an alarm analysis result to a PCF, and the PCF develops an alarm processing strategy according to the alarm analysis result.

An embodiment of the present disclosure further provides a storage medium having a computer program stored therein. The computer program is configured to perform the steps of the method according to any one of the above embodiments when being executed.

Optionally, in the embodiment, the storage medium may be configured to store a computer program for performing the following steps: S1, receiving a model matching instruction sent by an orchestrator, with the model matching instruction generated based on an analysis requirement; S2, searching for a model corresponding to the model matching instruction; and S3, when the model is found, pushing the found model to a destination node requiring the model.

Optionally, in the embodiment, the storage medium may be configured to store a computer program for executing the following steps: S1, generating a model matching instruction based on an analysis requirement; and S2, sending the generated model matching instruction to a model platform to instruct the model platform to search for a model corresponding to the model matching instruction, and pushing, when the model is found, the found model to a destination node requiring the model.

Optionally, in the embodiment, the above storage medium may include, but is not limited to, various media capable of storing a computer program, such as a Universal Serial Bus Flash Disk (a USB flash disk), an ROM, an RAM, a mobile hard disk, a magnetic disk and an optical disc.

An embodiment of the present disclosure further provides an electronic device, including a memory having a computer program stored therein, and a processor configured to execute the computer program to perform the steps of the method according to any one of the above embodiments.

Optionally, the electronic device may further include a transmission device connected to the processor, and an input/output device connected to the processor.

Optionally, in the embodiment, the processor may be configured to perform the following steps through a computer program: S1, receiving a model matching instruction sent by an orchestrator, with the model matching instruction generated based on an analysis requirement;

S2, searching for a model corresponding to the model matching instruction; and

S3, when the model is found, pushing the found model to a destination node requiring the model.

Optionally, reference may be made to the examples described in the above embodiments and optional implementations for specific examples of the embodiment, and thus the specific examples of the embodiment are not described in detail here.

Optionally, in the embodiment, the processor may be configured to perform the following steps through a computer program: S1, generating a model matching instruction based on an analysis requirement; and S2, sending the generated model matching instruction to a model platform to instruct the model platform to search for a model corresponding to the model matching instruction, and pushing, when the model is found, the found model to a destination node requiring the model.

It should be understood by those of ordinary skill in the art that all the modules or steps of the present disclosure described above may be implemented by a general-purpose computing device, may be integrated in a single computing device or distributed on a network composed of a plurality of computing devices. Optionally, the modules or steps may be implemented by program codes executable by a computing device, such that the modules or steps can be stored in a storage device and executed by a computing device. In some cases, the steps illustrated or described may be performed in an order different from that described herein. Alternatively, the modules or steps may be separately made into integrated circuit modules, or some of the modules or steps may be made into a single integrated circuit module. Thus, the present disclosure is not limited to any specific combination of hardware and software.

The description above is merely of the embodiments of the present disclosure, but is not intended to limit the present disclosure. Various modifications and changes may be made to the present disclosure by those of ordinary skill in the art. Any modification, equivalent replacement and improvement made within the principle of the present disclosure should be included in the protection scope of the present disclosure.

What is claimed is:

1. A model pushing method, applied to a telecommunication network, comprising:

receiving a model matching instruction sent by an orchestrator, wherein the model matching instruction is generated based on an analysis requirement;

searching for a model corresponding to the model matching instruction; and in a case where the model is found, pushing the found model to a destination node requiring the model, wherein the method further comprises:

receiving a model updating request, which is sent by the orchestrator in a case where the orchestrator detects that the model meets a model updating condition, wherein the model updating condition comprises that accuracy of the model pushed to the destination node is lower than a preset threshold;

sending the model corresponding to the model updating request to a sandbox, wherein the model corresponding to the model updating request is trained in the sandbox; and receiving the successfully trained model sent by the sandbox.

2. The method of claim 1, wherein searching for the model corresponding to the model matching instruction comprises at least one of:

searching a main model platform for the model corresponding to the model matching instruction;

searching a joint model platform of the main model platform for the model corresponding to the model matching instruction; or searching the main model platform and the joint model platform for the model corresponding to the model matching instruction.

3. The method of claim 1, further comprising:

feeding back a search success message to the orchestrator in a case where the model corresponding to the model matching instruction is found; and feeding back a search failure message to the orchestrator in a case where the model corresponding to the model matching instruction is not found.

4. The method of claim 1, wherein pushing the found model to the destination node requiring the model comprises:

packaging at least the model and metadata of the model into a file; and sending the packaged file to the destination node.

5. The method of claim 4, further comprising:

in a case where a single model is found, packaging the single model into a file and sending the file to the destination node; and in a case where a plurality of models are found, subjecting the plurality of models to a target operation, then packaging the plurality of models subjected to the target operation into a file, and sending the file to the destination node, wherein the target operation comprises at least one of: orchestration and combination; or verification.

6. The method of claim 1, wherein the model matching instruction comprises at least one of the following parameters: a model or algorithm attribute, model input and output requirements, indication information configured to indicate whether a joint model platform is to be searched, or information of the destination node.

7. A model requesting method, applied to a telecommunication network, comprising:

generating a model matching instruction based on an analysis requirement; and sending the generated model matching instruction to a model platform to instruct the model platform to search for a model corresponding to the model matching instruction, and pushing, in a case where the model is found, the found model to a destination node requiring the model, wherein the method further comprises:

in a case where it is detected that the model meets a model updating condition, sending a model updating request to the model platform to instruct the model platform to send the model corresponding to the model updating request to a sandbox, and receiving the successfully trained model sent by the sandbox, wherein the model corresponding to the model updating request is trained in the sandbox, and the model updating condition comprises that accuracy of the model pushed to the destination node is lower than a preset threshold.

8. The method of claim 7, after sending the generated model matching instruction to the model platform, further comprising:

receiving a search success message fed back by the model platform in a case where the model corresponding to the model matching instruction is found; and receiving a search failure message fed back by the model platform in a case where the model corresponding to the model matching instruction is not found.

9. A model pushing device, comprising a processor and a memory, the memory having instructions stored therein which, when being executed, cause the processor to perform the method of claim 1.

10. A model requesting device, comprising a processor and a memory, the memory having instructions stored therein which, when being executed, cause the processor to perform the method of claim 7.

11. A non-transitory storage medium having a computer program stored therein, wherein the computer program is configured to perform the method of claim 1 when being executed.

12. An electronic device, comprising a memory having a computer program stored therein, and a processor configured to execute the computer program to perform the method of claim 1.

13. A non-transitory storage medium having a computer program stored therein, wherein the computer program is configured to perform the method of claim 7 when being executed.

14. An electronic device, comprising a memory having a computer program stored therein, and a processor configured to execute the computer program to perform the method of claim 7.

15. The method of claim 2, wherein the model matching instruction comprises at least one of the following parameters: a model or algorithm attribute, model input and output requirements, indication information configured to indicate whether a joint model platform is to be searched, or information of the destination node.

16. The method of claim 3, wherein the model matching instruction comprises at least one of the following parameters: a model or algorithm attribute, model input and output requirements, indication information configured to indicate whether a joint model platform is to be searched, or information of the destination node.

17. The method of claim 4, wherein the model matching instruction comprises at least one of the following parameters: a model or algorithm attribute, model input and output requirements, indication information configured to indicate whether a joint model platform is to be searched, or information of the destination node.

18. The method of claim 5, wherein the model matching instruction comprises at least one of the following parameters: a model or algorithm attribute, model input and output requirements, indication information configured to indicate whether a joint model platform is to be searched, or information of the destination node.

\* \* \* \* \*